United States Patent [19]

Proctor

[11] 4,383,692
[45] May 17, 1983

[54] GROMMET SEAL

[75] Inventor: Robert H. Proctor, Cockeysville, Md.

[73] Assignee: Murray Corporation, Cockeysville, Md.

[21] Appl. No.: 269,680

[22] Filed: Jun. 2, 1981

[51] Int. Cl.³ .................. H01B 17/30; F16L 5/02
[52] U.S. Cl. ................. 277/178; 277/213; 285/177
[58] Field of Search ............ 285/177; 277/213, 214, 277/215, 178, 224

[56] References Cited

U.S. PATENT DOCUMENTS

| 684,909 | 10/1901 | Cole . | |
|---|---|---|---|
| 2,171,049 | 8/1939 | Simmons | 277/124 |
| 2,974,186 | 3/1961 | Klumpp . | |
| 3,091,795 | 6/1963 | Budwig . | |
| 3,193,613 | 6/1965 | Van Buren . | |
| 3,701,505 | 10/1972 | Klumpp . | |
| 3,995,332 | 12/1976 | Forchini et al. | 277/178 |
| 4,041,241 | 8/1977 | Olmstead et al. | 277/178 |
| 4,089,496 | 5/1978 | Mizusawa . | |
| 4,137,602 | 2/1979 | Klumpp . | |

FOREIGN PATENT DOCUMENTS

| 158182 | 2/1921 | United Kingdom | 277/213 |
|---|---|---|---|
| 432903 | 8/1935 | United Kingdom | 285/177 |

Primary Examiner—Robert I. Smith
Attorney, Agent, or Firm—Isler and Ornstein

[57] ABSTRACT

A grommet seal is disclosed comprising a cup-shaped part or piece adapted to provide a substantially air-tight seal between a wire, rod or tube and a metallic panel or the like through which the wire, rod or tube passes, and a mating part or piece interfitted with said cup-shaped part or piece, and adapted to act in combination or conjunction therewith to improve or complete the seal. The parts or pieces are provided with tongues which are flexibly movable relatively to the wire, rod or tube, to accommodate the passage through the grommet seal of wires, rods or tubes of varying or different diameters or sizes.

5 Claims, 12 Drawing Figures

U.S. Patent   May 17, 1983   Sheet 3 of 3   4,383,692
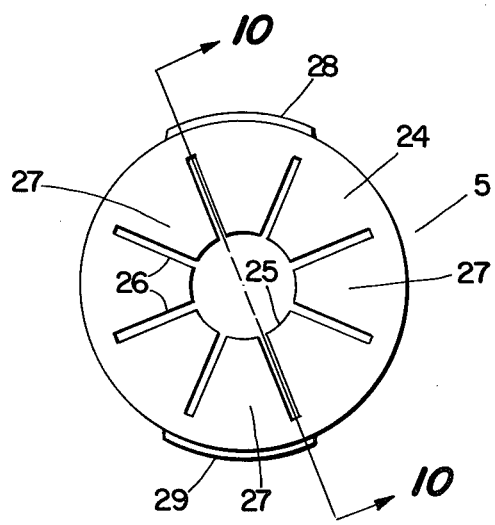
Fig. 8
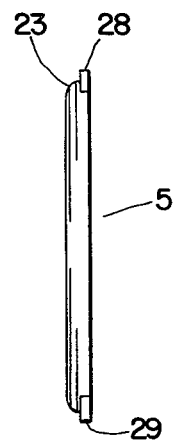
Fig. 9
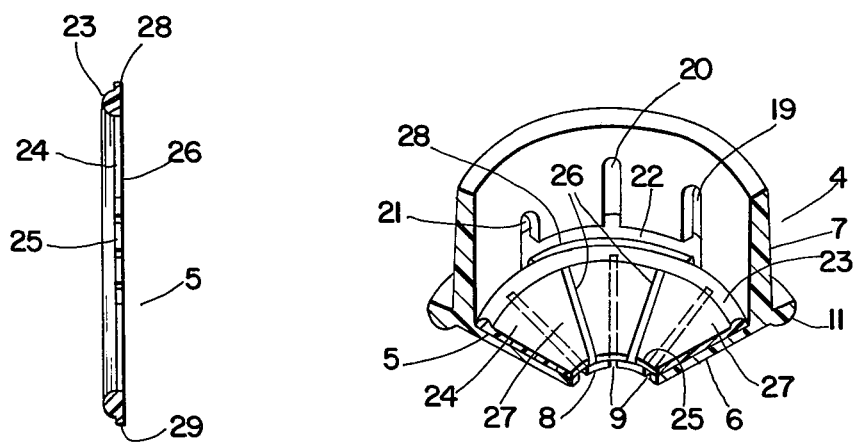
Fig. 10
Fig. 11
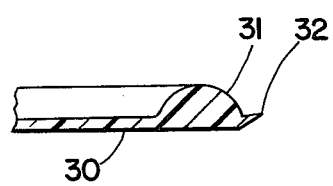
Fig. 12

GROMMET SEAL

BACKGROUND OF THIS INVENTION

This invention relates to improvements in and concerning a grommet seal made of a thermoplastic resin.

It has heretofore been proposed, as in U.S. Pat. Nos. 684,909; 2,974,186; 3,091,795; 3,193,613; 3,701,505; 4,089,496 and 4,137,602, to provide devices variously referred to as plugs, bushings, grommets, and cable connectors, and designed primarily for protecting wiring, cable, tubing or rods passing through a sheet metal panel.

The device usually comprises a plug or bushing which passes through a hole or aperture in the panel, and provided with tabs or locking fingers for locking the plug or bushing to the panel.

In some cases, the bushing or plug is provided with a flexible web having a central aperture for passage therethrough of wires, cables, or tubes of different diameters, and a series of circumferentially-spaced slits which extend radially from said aperture. The portions of the web between the slits provide tongues which flex to accomodate such wires of different diameters.

In using such bushings or plugs, air leakage occurs through or along the slits, as well as at the areas engaged by the locking tabs.

Where such devices are used in connection with the fire wall of an automobile, and holes are drilled in the fire wall for passage therethrough of the suction and liquid lines, or conduits of the air conditioning system of the automobile, they protect the lines or conduits from being damaged or cut by the sharp edges of the holes, but serve little or no purpose in providing an air-tight seal in the fire wall between the engine compartment and the passenger compartment of the automobile. The provision of an air-tight seal at these points is of paramount importance in order to prevent the noxious or undesirable atmosphere in the engine compartment from entering the passenger compartment.

SUMMARY OF THE INVENTION

The present invention has as its primary object the provision of a grommet seal of the character described which not only precludes damage to the wires or cables or tubes which pass through the fire wall, but is also highly effective in controlling passage of air through the slits and tab areas to which reference has been made, whereby a virtually air-tight seal is provided and the passage of the undesirable atmosphere of the engine compartment into the passenger compartment is avoided.

As a means for accomplishing these objects, I provide a mating piece, made of the same or similar material as that from which the plug or bushing is made, and having a flexible web having a central aperture for passage therethrough of the wire, cable or tube, and a series of circumferentially-spaced slits which extend radially from said aperture, the portions of the web between the slits forming tongues which flex to accommodate such wires, cables or tubes of different diameters.

This mating piece is designed to be frictionally received in the plug or bushing, but the slits thereof are in staggered relationship to those of the plug or bushing.

I have found that by the use of such a mating piece, the passage of air through the slits of the plug or bushing is greatly reduced, and the undesirable atmosphere of the engine compartment into the passenger compartment is virtually eliminated.

Other objects and advantages of the invention will become apparent from the description to be given in further detail herein below with reference to the attached drawings.

BRIEF DESCRIPTION OF THE DRAWINGS

FIG. 8 is a top plan view of a mating piece or part of the grommet seal which is used in combination or conjunction with the grommet part shown in FIGS. 2, 3, 4, 5, 6 and 7;

FIG. 9 is a side elevational view of the mating piece or part shown in FIG. 8;

FIG. 10 is a cross-sectional view, taken on the line 10—10 of FIG. 8;

FIG. 11 is a fragmentary isometric or perspective view, showing the combination of the mating piece or part of FIGS. 8, 9 and 10 with the part shown in FIGS. 2, 3, 4, 5, 6 and 7, and FIG. 12 is a fragmentary cross-sectional view, showing a modification of the mating piece or part.

DETAILED DESCRIPTION OF THE PREFERRED EMBODIMENTS

Figure 1:
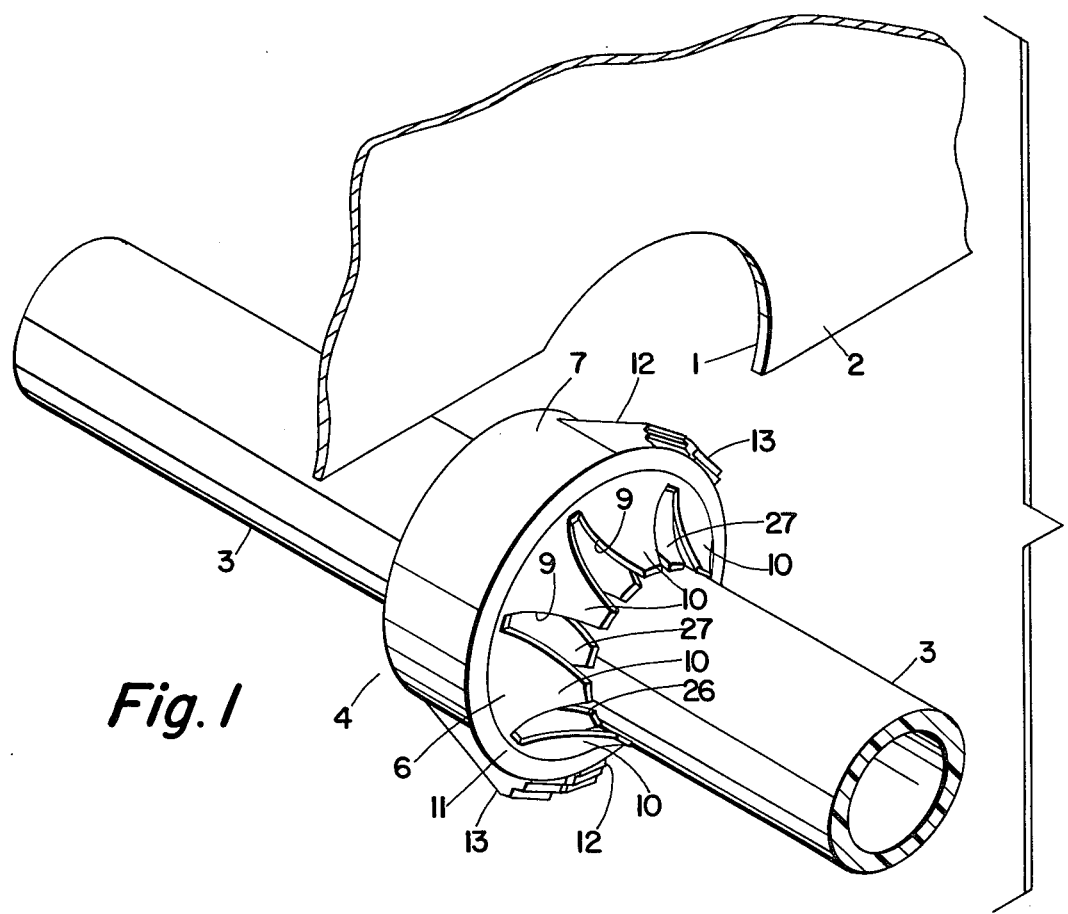
FIG. 1 is a fragmentary isometric or perspective view, showing the manner in which the grommet seal is used in connection with the air conditioning system of an automobile.
Figure 2:
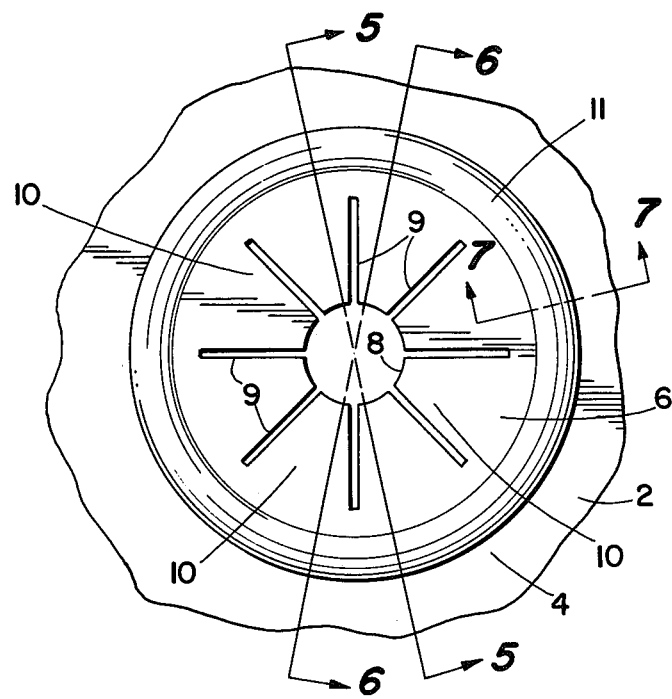
FIG. 2 is a fragmentary top plan view of the outer portion or part of a grommet seal embodying the invention, and showing the part inserted in a hole in a metal panel.
Figure 3:
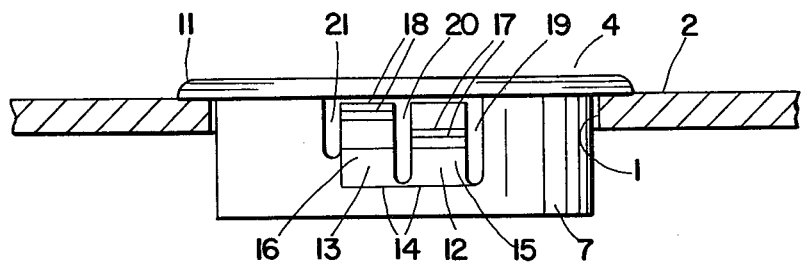
FIG. 3 is a front elevational view of the grommet seal part of FIG. 2, as viewed from the lower end of FIG. 2.
Figure 4:
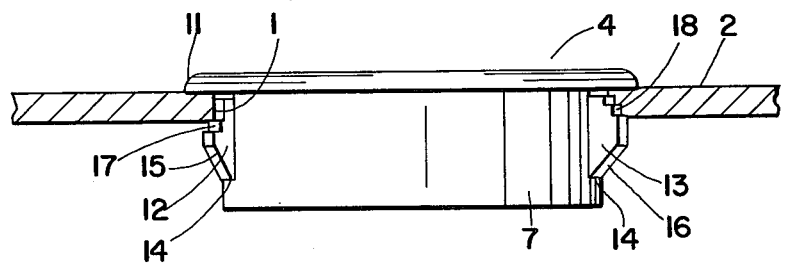
FIG. 4 is a side elevational view of the grommet seal part of FIG. 2, as viewed from the right side of FIG. 3.
Figure 5:
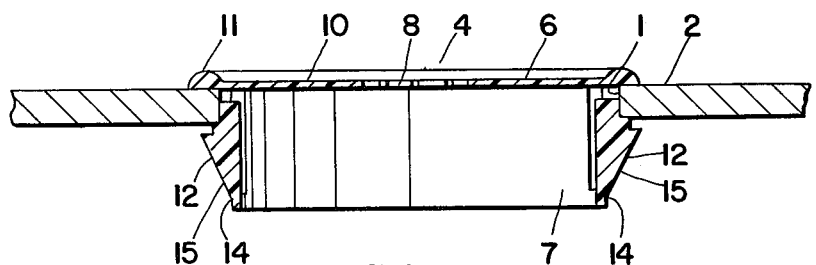
FIG. 5 is a fragmentary cross-sectional view, taken on the line 5—5 of FIG. 2.
Figure 6:
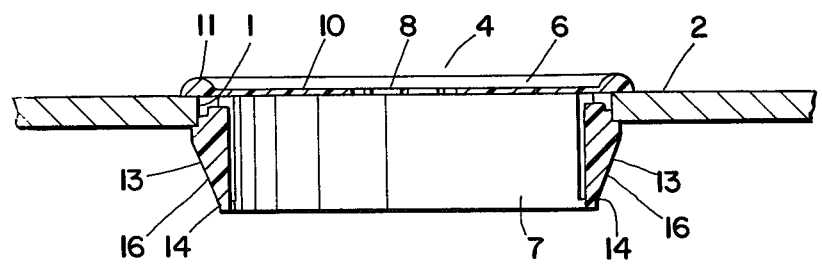
FIG. 6 is a fragmentary cross-sectional view, taken on the line 6—6 of FIG. 2.
Figure 7:
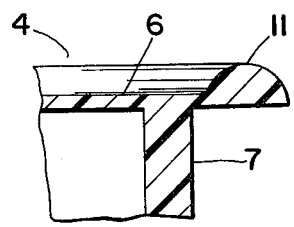
FIG. 7 is a fragmentary cross-sectional view, taken on the line 7—7 of FIG. 2.

Referring more particularly to FIGS. 1 to 11 inclusive of the drawings, the grommet seal, in this instance, is designed specifically for use in an air conditioning system of an automobile.

For this purpose, a hole 1 is drilled through the fire wall 2 of the automobile for the passage therethrough of the suction line 3, and a second hole (not shown) is drilled through the fire wall for the passage therethrough of the liquid line of the air conditioning system.

For the purpose of forming a seal between the fire wall 2 and the suction line 3, a grommet seal is provided which consists of two parts, one designated generally by reference numeral 4, and the other designated generally by reference numeral 5.

The part 4 is preferably molded in one piece from a thermoplastic resin or like material to provide a circular base or web 6, and an annular side wall 7, which extends from the web 6, and is of lesser diameter than the base or web 6. In this instance, the outer diameter of the wall 7 is about 1.25", so as to be frictionally fitted into the hole 1 in the fire wall 2.

The base or web 6 of the part 4 is provided at its center with a circular opening or aperture 8 for the passage therethrough of the suction line 3, and a series of circumferentially-spaced slits 9, which extend radially from said opening or aperture. The portions of the base or web 6 between the slits 9 provide tongues or ears 10 which flex to accomodate passage of suction lines of different diameters. In this instance, the opening or aperture 8 is 0.359" in diameter, to accommodate suction line sizes of diameters in excess of 0.359". The slits extend to points adjacent the inner surface of the wall 7.

The part or piece 4 further includes an annular bead 11, which surrounds the base or web 6 and is adapted to abut the fire wall 2, when the part 4 of the grommet seal is attached to the fire wall, as best seen in FIGS. 3, 4, 5, 6 and 7.

For the purpose of locking the part 4 to the fire wall 2, the annular side wall 7 is provided at diametrically-opposite points thereof with pairs of tabs 12 and 13, which extend upwardly from points 14 of the wall, and have a limited degree of pivotal movement about these points.

The tabs 12 have inclined edges 15, in the lower portions thereof, and the tabs 13 have similar inclined edges 16 in the lower portions thereof, so that when part 4 is pushed into the hole 1 in the fire wall 2, these inclined edges are cammed inwardly by the edge of the hole, to thereby cam the tabs 12 and 13 inwardly, to permit the tabs to pass through the hole.

After the tabs have passed through the hole, the inherent resiliency of the tabs causes them to resume their original position, as shown in FIGS. 3, 4, 5 and 6, thereby locking the tabs to the fire wall.

It will be noted that the tabs 12 are provided with vertically-spaced notches to accommodate the tabs to fire walls or panels of different thicknesses, and that the tabs 13 are provided with vertically-spaced notches 18 to accommodate the tabs to fire walls of thicknesses different from those accommodated by the notches 17.

It will be further noted that the formation or arrangement of the tabs 12 and 13 is such as to leave spaces 19, 20, 21 and 22 in the wall 7 (see FIGS. 3 and 11), through which air may leak or pass from the engine compartment to the passenger compartment of the automobile.

In addition to such leakage, some of the air leaks or passes through the slits 9 of the part 4.

In order to prevent or minimize such leakage, the part 5 of the grommet seal is provided.

The part 5, as best seen in FIGS. 1, 8, 9, 10 and 11, is preferably molded, in one piece, from a thermoplastic resin or like material, similar to that of the part 4, to provide an annular bead 23 of a diameter such that it can be frictionally fitted into the wall 7 of the part 4 and a web 24, which extends inwardly from the bead 23.

The web 24 of the part 5 is provided at its center with a circular opening or aperture 25 for the passage therethrough of the suction line 3, and a series of circumferentially-spaced slits 26, equal in number to the slits 9, and which extend radially outwardly from said opening or aperture.

The portions of the base or web 24 between the slits 26 provide tongues or ears 27 which flex to accommodate passage of suction lines of different diameters. In this instance, the opening or aperture 25 is 0.359" in diameter, to accommodate suction line sizes of diameters in excess of 0.359". The slits 26 terminate short of the bead 23.

As best seen in FIGS. 1 and 11, the slits 26 are in staggered relationship to the slits 9 of the part 4, so that the tongues or ears 27 cover the slits 9, when the parts 4 and 5 are assembled.

For the purpose of effecting this staggered relationship between the slits 26 and 9, the part 5 is provided at diametrically-opposite edges thereof with arcuate flanges 28 and 29, which extend radially-outwardly from the bead 23 and into the spaces 22 in the wall 7.

The flanges 28 and 29 are of substantially the same length as the spaces 22, so that when the flanges enter these spaces, they automatically bring about the staggered relationship of the slits 26 and 9.

Since the flanges 28 and 29 extend into the spaces 22, they are effective to aid in preventing passage or leakage of air through these spaces.

Moreover, since the tongues or ears 27 cover the slits 9, they effectively prevent passage or leakage of air through the slits 9, and thus aid in preventing the undesirable atmosphere of the engine compartment to the passenger compartment of the automobile.

The security of the seal is dependent to some extent on the plasticity of the part 5, in that the tongues of the part 4 must cause plastic deformation where they cross the edges of the tongues of the part 5, to provide a tight seal.

It may be further noted that the flexible tongues or ears of the grommet parts can flex in either direction, relatively to the fire wall 2, without losing any of its intended function. It is further evident that the tube which passes through the grommet seal can be of various diameters, and need not be exactly circular in cross-section, nor at right angles to the fire wall.

Although the invention has been described more particularly with reference to its use in conjunction with an automobile air conditioning system, it will be understood that it may be used in combination with a tube, hose, rod, or wiring which is intended to go through a sheet metal panel, or protecting the wire (or refrigerant hose) from the sharp edges of the hole.

It may also be noted, in FIG. 1 that the tube 3 going through the grommet 4 need not pass through the grommet perpendicularly to the panel 2, in order to be properly sealed. For this purpose, the opening in the grommet assembly would be an ellipse, rather than a circle, without adversely affecting the seal.

It should also be noted that the very nature of the seal would tend to center the tube 3 in the hole 2 with equal force around the circumference of the tube 3. However, with considerable latitude, the center line of the tube 3 would not necessarily have to be coincident with nor even parallel with the center line of the hole 1.

It may be further noted that the ears 12 and 13 are designed for use with standard metallic panels; however, any panel of approximately any thickness up to ½ inch could be accommodated by revising the dimensions and description of the locking tabs or ears.

In FIG. 12, a modification of the mating piece or part is shown, comprising a web 30, similar to the web 24, an annular bead 31 similar to the bead 23, and a flexible flange 32, which projects outwardly from the bead 31, and provides an effective seal between the mating piece and the part 4.

Having thus described my invention, I claim:

1. A grommet seal comprising a cup-shaped member having a circular base or web and an annular side wall of substantially cylindrical configuration formed integrally with said base or web and projecting from the periphery of said base or web and having a central opening, and a plurality of circumferentially-spaced slits extending radially-outwardly from said opening and providing therebetween flexible tongues and a mating piece or part disposed in said member and having circular base or web having a central opening, and a plurality of circumferentially-spaced slits extending radially-outwardly from said second opening and providing therebetween flexible tongues adapted to overlie the slits of said cup-shaped member, said second named slits being in circumferentially-staggered relationship to the slits of said cup-shaped member.

2. In combination with a panel having a hole therein, a grommet seal for said hole, said seal comprising a cup-shaped member having a web and a side wall extending through said hole, said web having a central opening and a multiplicity of circumferentially-spaced slits extending radially outwardly from said opening, and providing therebetween flexible tongues, a conduit extending through said opening and engaged by said tongues, means for locking said cup-shaped member against axial movement relatively to said panel, and a mating piece disposed in said member and having a central opening for passage therethrough of said conduit and a multiplicity of circumferentially-spaced slits extending radially outwardly from said second-named opening and providing therebetween a second series of flexible tongues engaging said first-named tongues and in staggered arrangement with said first-named tongues.

3. A grommet seal comprising a cup-shaped member having a base or web and an annular wall projecting from said base; said base or web having a central opening and a plurality of circumferentially-spaced slits extending radially-outwardly from said opening and providing therebetween flexible tongues, and a mating piece or part disposed in said member and having a base or web having a central opening and a plurality of circumferentially-spaced slits extending radially-outwardly from said second opening and providing therebetween flexible tongues adapted to overlie the slits of said cup-shaped member, said second-named slits being in circumferentially-staggered relationship to the slits of said cup-shaped member, said mating piece being provided with means for locking said mating piece against circumferential movement relatively to said cup-shaped member.

4. A grommet seal, as defined in claim 3, wherein said cup-shaped member is provided with circumferentially-spaced tabs for locking said member against axial movement.

5. In combination with a panel having a hole therein, a grommet seal for said hole, said seal comprising a cup-shaped member having a web and a side wall extending through said hole, said web having a central opening and a multiplicity of circumferentially-spaced slits extending radially outwardly from said opening, and providing therebetween flexible tongues, a conduit extending through said opening and engaged by said tongues, means for locking said cup-shaped member against axial movement relatively to said panel, a mating piece disposed in said member and having a central opening for passage therethrough of said conduit and a multiplicity of circumferentially-spaced slits extending radially-outwardly from said second-named opening and providing therebetween a second series of flexible tongues engaging said first-named tongues and in staggered arrangement with said first-named tongues, and means for locking said mating piece against movement circumferentially relatively to said cup-shaped member.

* * * * *